United States Patent [19]
Barthe et al.

[11] Patent Number: 5,406,086
[45] Date of Patent: Apr. 11, 1995

[54] PARTICLE DOSE RATE METER

[75] Inventors: Jean Barthe, Massy; Thierry LaHaye, Savigny/Orge, both of France

[73] Assignee: Commissariat a l'Energie Atomique, France

[21] Appl. No.: 215,190

[22] Filed: Mar. 21, 1994

[30] Foreign Application Priority Data

Apr. 13, 1993 [FR] France .................. 93 04314

[51] Int. Cl.6 ..................... G01T 1/17; G01T 1/24
[52] U.S. Cl. .................... 250/390.03; 250/370.07
[58] Field of Search ............... 250/390.02, 390.03, 250/390.05, 390.06, 390.07, 390.10, 390.11, 369, 390.01, 370.05, 370.06, 370.07

[56] References Cited

U.S. PATENT DOCUMENTS

| H590 | 2/1989 | Chiles et al. | 250/390.11 |
|---|---|---|---|
| 2,270,373 | 1/1942 | Kallman | 250/390.02 |
| 4,489,315 | 12/1984 | Falk et al. | |
| 4,884,288 | 11/1989 | Sowerby | 250/390.05 |
| 5,004,921 | 4/1991 | Moscovitch | 250/390.03 |
| 5,083,028 | 1/1992 | Decossas et al. | 250/390.03 |
| 5,231,290 | 7/1993 | Czirr et al. | 250/369 |

FOREIGN PATENT DOCUMENTS 0391789 10/1990 France .

OTHER PUBLICATIONS

Grudskaya et al. "Phoswich For Neuron Detection", Instrum. & Exp. Tech (USA) No. 4 (Jul.-Aug. 1970) pp. 1006-1007.

Shiraishi et al. "A New Type Personnel Neutron Dosimeter With Thin Si Detectors", IEEE Transactions on Nuc. Sci., No. 1 Feb. 1988 vol. 211, pp. 575-578.

Eisen et al. "Combined Neutron Dosimeter & Survey Meter", Nuc. Instrum. & Meth. In Physics Research, No. 1 Jun. 1983 vol. 211 pp. 173-178.

Primary Examiner—Constantine Hannaher
Assistant Examiner—Edward J. Glick
Attorney, Agent, or Firm—Hayes, Soloway, Hennessey, Grossman & Hage

[57] ABSTRACT

A radiation dose rate meter is provided which includes a diode for sensing radiation, and an electric measuring circuit divided into two branches having different frequential filters, one filter for measuring alpha particles, protons and neutrons and another filter for measuring electrons and photons (i.e., particles that deliver differently shaped pulses of upon reaching the diode). The dose rate meter is able to accurately determine the dosage of radiation effectively received.

6 Claims, 2 Drawing Sheets

PARTICLE DOSE RATE METER

FIELD OF THE INVENTION

The invention concerns a particle dose rate meter or dosimeter.

BACKGROUND OF THE INVENTION

It is necessary to evaluate doses of nuclear particles in several applications and in particular to assess the risks run by living beings to be accurately evaluated by what is called a dose equivalent, that is the sum of the doses of particles of each species weighted by multiplier coefficients (quality factors).

An example of a dose rate meter is described in the preceding French patent of the same inventors (FR-A-2 645 652). It includes two semiconductor diodes each delivering a signal on an electric circuit. This signal is proportional to the dose equivalent flow rate of the particles which reach the diode. The characteristic feature of this prior device consists in that one of the diodes is covered by a hydrogenated screen which reacts with the neutrons so that it solely is sensitive to the neutrons and photons. The measurements consist of subtracting from the signal of this diode that of the other so as to obtain the dose flow rate associated with the single neutrons of the radiation.

There are two criticisms regarding this device: the influence of the photonic radiation (X-rays or $\gamma$-rays), which comprises the real mixed radiation, is ignored, although its effects may be quite considerable in practice, and in particular the diodes are always different, irrespective of the production precautions taken, and have different sensitivities. The result may thus contain a large number of errors.

There also exist portable dose rate meters (for example in U.S. Pat. No. 4 489 315) which separately measure the flow rates of the two different categories of neutrons so as to evaluate the equivalent of the dose by means of a weighting. These devices are subject to the same drawbacks, namely of ignoring the flow rate of the $\gamma$ rays and of using two separate detectors.

SUMMARY OF THE INVENTION

The object of the invention is to provide an indication of the equivalent of the dose received by measuring both the flow rates of the particles characteristic of the neutronic radiation and the gamma radiation. By virtue of this distinction, it is possible to carry out the weighting which gives the dose equivalent. Better accuracy is obtained, although the device is much simpler as a single diode is used.

The invention thus concerns a dose rate meter including a single semiconductor diode delivering a signal on an electric circuit according to the flows of particles which reach the diode, the electric circuit including means for measuring the signal, said dose rate meter being characterized in that the circuit and the measuring means are split into two branches bearing different frequential filters, one being adapted to measuring the flowrate of the neutrons by means of the protons and the alpha particles, the other being adapted to measuring the flowrate of the photons by means of the electrons.

One of the filters may be a high pass filter and the other a low pass filter.

BRIEF DESCRIPTION OF THE DRAWINGS

There now follows a more detailed description of the invention with reference to the accompanying drawings given solely by way of non-restrictive illustration.

DETAILED DESCRIPTION OF THE PREFERRED EMBODIMENTS

Figure 1:
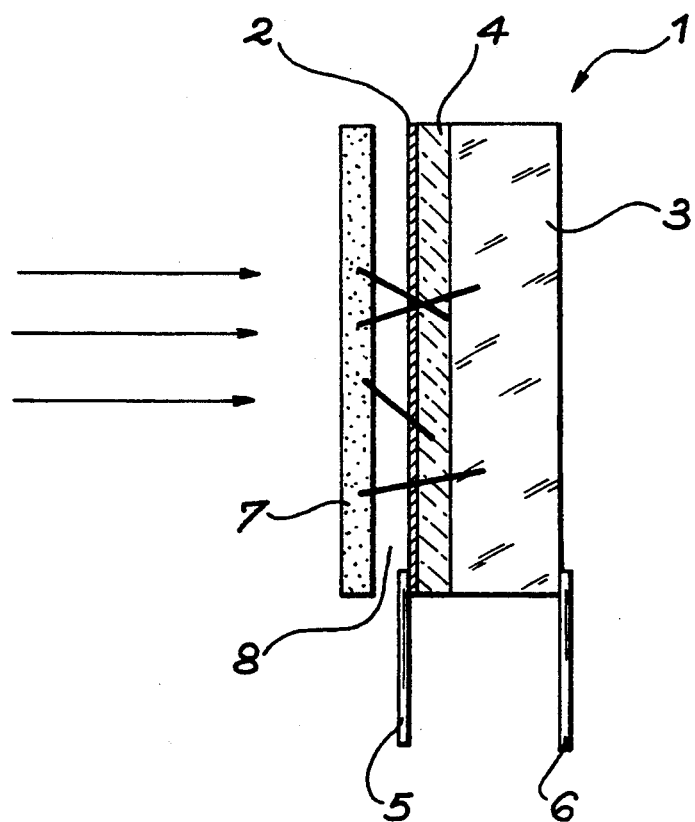
FIG. 1 is an illustration of the diode.

The sole diode 1 is uniformly composed of an electrode 2 at the front, a silicon substrate 3 at the rear and an intermediate abandoned zone. The indications given in the preceding patent are still valid in this instance; in particular, the polarization voltage of the diode 1 may be several volts, which enables it to be fed by batteries and render the dose rate meter portable; the surface of the diode 1 may be several hundreds of square centimeters; and the thickness of the abandoned zone 4 may be several tens of microns.

The electrode 2 is an extremely thin plate connected to an electric anode contact 5 and a cathode electric contact 6 is connected to the silicon substrate 3. A pulse circulates in the electric circuit situated between the anodic contact 5 and the cathode contact 6 when the abandoned zone 4 is reached by a particle. However, the neutrons are scarcely able to act on the silicon and this is why a hydrogenated converter 7 is provided which covers the electrode 3 whilst being separate from the latter by means of a contact space 8.

The hydrogenated converter 7 reacts with each impact of the neutron, thus freeing a recoil proton towards the diode 1. The hydrogenated converter 7, as mentioned in the preceding patent, may consist of a polyethylene sheet enriched with boron, lithium or helium atoms; the density and depth of penetration and the thickness of the sheet determine the sensitivity of the hydrogenated converter 7. But it is difficult to select these factors so as to ensure that sensitivity is uniform for all the neutron energies.

This is why it is preferable to use a hydrogenated converter 7 sensitive to the fast neutrons and insensitive to the thermal neutrons, a disparity which is corrected by enriching the substrate 3 with boron atoms 10 to a sufficient concentration so that the thermal neutrons produce particles $\alpha$ in such a proportion so that the overall sensitivity of the system is identical for the fast and thermal neutrons.

Figure 2:
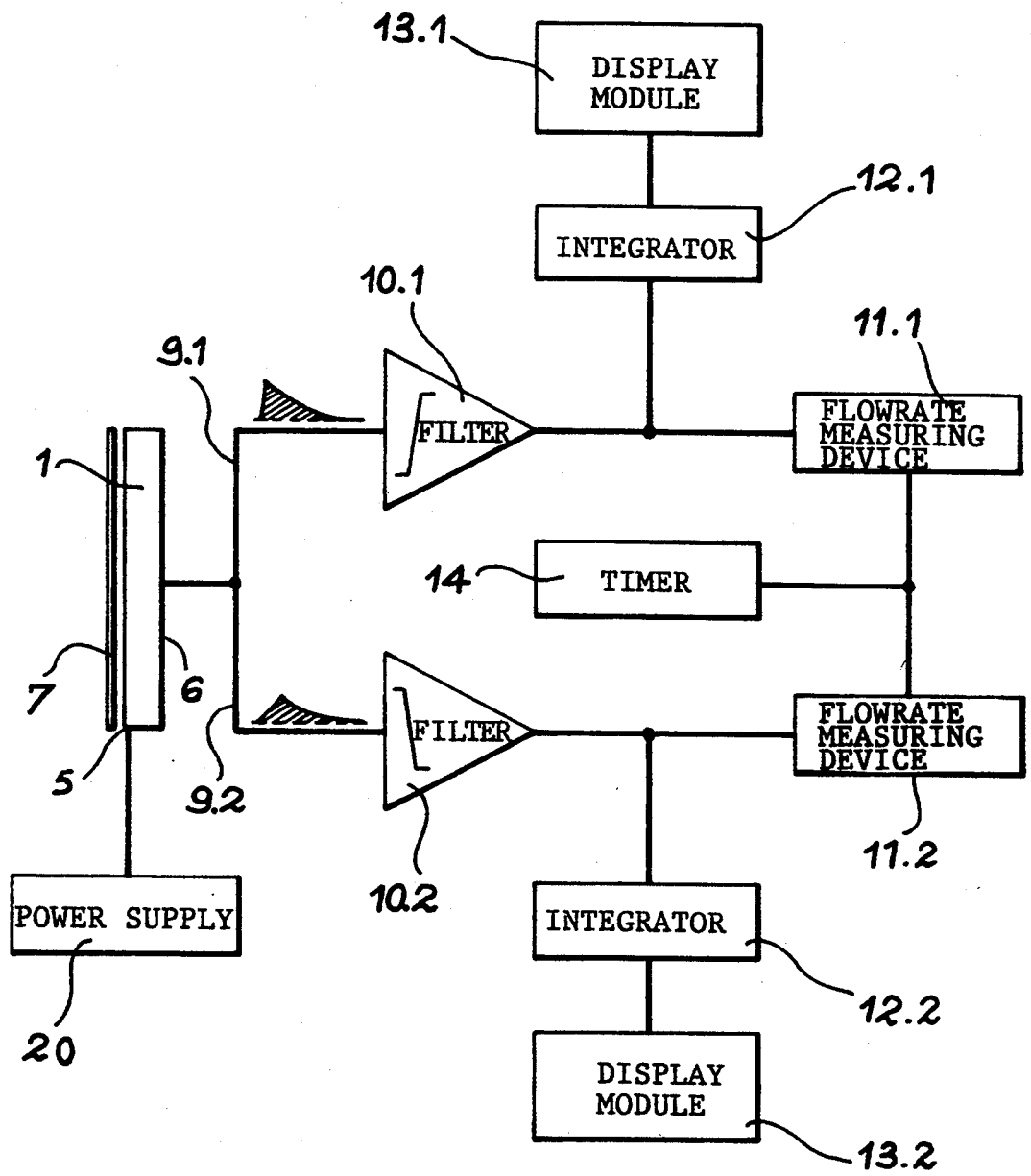
FIG. 2 is an illustration of the circuit.

Reference is now made to FIG. 2. The anode contact 5 is connected to an electric power supply 20 and the circuit situated on the side of the cathodic contact 6 is broken down into two branches 9.1 and 9.2 on each of which successively disposed is a filter 10.1 and 10.2, a flowrate measuring device 11.1 and 11.2 integrator 12.1 and 12.2 a display module 13.1 and 13.2 These last three elements 12.1 and 12.2 and 13.1 and 13.2 of the two branches 9.1 and 9.2 are identical but the filters 10.1 and 10.2 are different as the first one is a high pass filter and the second a low pass filter: the branch 9.1 is allocated to measuring the flowrates of the protons and particles $\alpha$ collected by the diode 1 and the branch 9.2 is allocated to measuring the flowrate of the electrons collected by the diode 1 in response to the impacts of incident electrons or following a conversion of the flow of the incident photons via a Compton or photoelectric effect.

Figure 3:
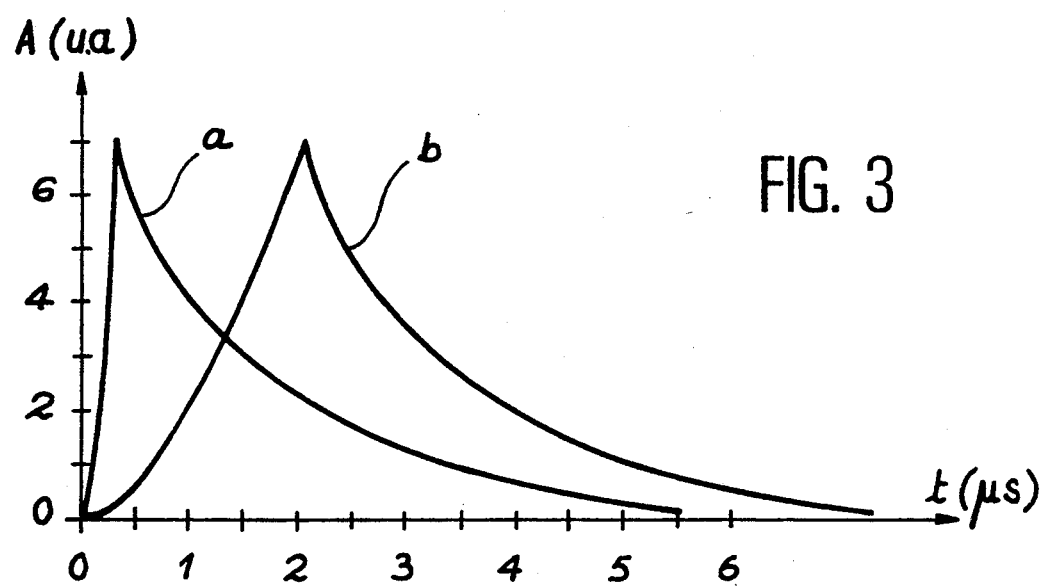
FIG. 3 is an illustration of the observed phenomena.

As the phenomenon encountered is the one summarized on FIG. 3 where the curves a and b indicate the shape of the pulses (in arbitrary units) according to the time (expressed in microseconds) produced when a proton, alpha particle or a neutron or a photon or electron respectively reaches the diode 1: the maximum of the curve a is reached at the end of a period of between about 0.05 and 0.5 microseconds, whereas the rise of the pulse is significantly slower for the curve b as the maximum is only reached after about 0.5 to 2 microseconds. The filter 10.1 is therefore provided to eliminate the contribution of all the pulses whose rise time is less than 0.5 microseconds. This difference of the pulse curves, which has been experimentally verified for the diodes, renders discrimination much easier. The flowrates of the heavy particles (neutrons, alphaparticles and protons) and the light ones (electrons and photons) are measured independently and integrated by the integrators 12.1 and 12.2 respectively. A timer 14 is able to time the measurement of the flowrate (so as to obtain a sliding average) but the system may also provide the equivalent of the total dose from the start of use of the dose rate meter, and an alarm may be programmed if the flowrate or total dose exceeds a given threshold. All these dispositons depend on the desired flexibility of use and may be easily embodied by an expert in this field.

The dose rate meter normally remains small and light, thus enabling it to be portable and be fastened to a person whose daily exposure to radiation needs to be followed up.

What is claimed is:

1. A dose rate meter comprising a semiconductor diode for delivering a signal on an electric circuit according to flowrates of particles reaching the diode, the electric circuit including means for measuring the signal, and wherein the circuit and the measuring means include two branches having different frequential filters with respective flowrate measuring devices, one filter and said one filter's measuring device being adapted to measure a flowrate of heavy particles including alpha particles, proton and neutrons and the other filter and said other filter's measuring device being adapted to measure a flowrate of light particles including electrons and photons.

2. A dose rate meter according to claim 1, wherein one of the filters is a high pass filter and the other is a low pass filter.

3. A dose rate meter according to claim 2, wherein the diode is covered with a hydrogenated converter for emitting protons when said converter is reached by neutrons.

4. A dose rate meter according to claim 3, wherein the diode is enriched with atoms for emitting protons when said atoms are reached by thermal neutrons.

5. A dose rate meter according to claim 1, wherein the diode is covered with a hydrogenated converter for emitting protons when said converter is reached by neutrons.

6. A dose rate meter according to claim 5, wherein the diode is enriched with atoms for emitting protons when said atoms are reached by thermal neutrons.

* * * * *